United States Patent
Tyni et al.

(10) Patent No.: US 7,546,906 B2
(45) Date of Patent: Jun. 16, 2009

(54) ELEVATOR SYSTEM

(75) Inventors: Tapio Tyni, Hyvinkää (FI); Jari Ylinen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 12/216,314

(22) Filed: Jul. 2, 2008

(65) Prior Publication Data

US 2008/0296099 A1 Dec. 4, 2008

Related U.S. Application Data

(63) Continuation of application No. PCT/FI2007/000038, filed on Feb. 16, 2007.

(51) Int. Cl.
*B66B 1/18* (2006.01)

(52) U.S. Cl. .................... 187/382; 187/247

(58) Field of Classification Search ............ 187/247, 187/248, 380–388, 391–393; 706/13, 21, 706/902, 903, 910
See application file for complete search history.

(56) References Cited

U.S. PATENT DOCUMENTS

| | | | |
|---|---|---|---|
| 4,402,387 A | | 9/1983 | Tsuji et al. |
| 5,907,137 A | * | 5/1999 | Tyni et al. .................... 187/382 |
| 6,644,442 B1 | * | 11/2003 | Ylinen et al. ................ 187/382 |
| 6,889,799 B2 | * | 5/2005 | Tyni et al. .................... 187/282 |
| 6,945,365 B2 | * | 9/2005 | Matela ........................ 187/382 |
| 7,140,472 B2 | * | 11/2006 | Tyni et al. .................... 187/382 |
| 7,246,686 B2 | * | 7/2007 | Smith et al. .................. 187/290 |
| 2004/0040791 A1 | | 3/2004 | Tyni et al. |
| 2005/0006183 A1 | | 1/2005 | Smith et al. |
| 2005/0224296 A1 | | 10/2005 | Smith et al. |
| 2008/0105499 A1 | * | 5/2008 | Tyni et al. .................... 187/382 |
| 2008/0179143 A1 | * | 7/2008 | Tyni ............................ 187/316 |

FOREIGN PATENT DOCUMENTS

WO  WO-02/088014 A2  11/2002

\* cited by examiner

*Primary Examiner*—Jonathan Salata
(74) *Attorney, Agent, or Firm*—Birch, Stewart, Kolasch & Birch, LLP

(57) ABSTRACT

The present invention discloses an extension to a prior-art genetic algorithm, with which the routing of elevators based on the calls given in an elevator system is formed. A new type of gene, a so-called run type gene, is connected to the chromosome of the genetic algorithm according to the invention, with which gene the desired speed profile for the elevator trip can be set. In this way e.g. an upper limit can be set for the acceleration or for the maximum travel speed of the elevator. By means of the run type gene a kinetic energy term is included in the optimization. The energy consumed by the system can thus be minimized more effectively by means of the algorithm, because the varying travel speeds of the elevators create more freedom of choice for the chromosomes of the algorithm.

31 Claims, 2 Drawing Sheets

ELEVATOR SYSTEM

Figure 1:
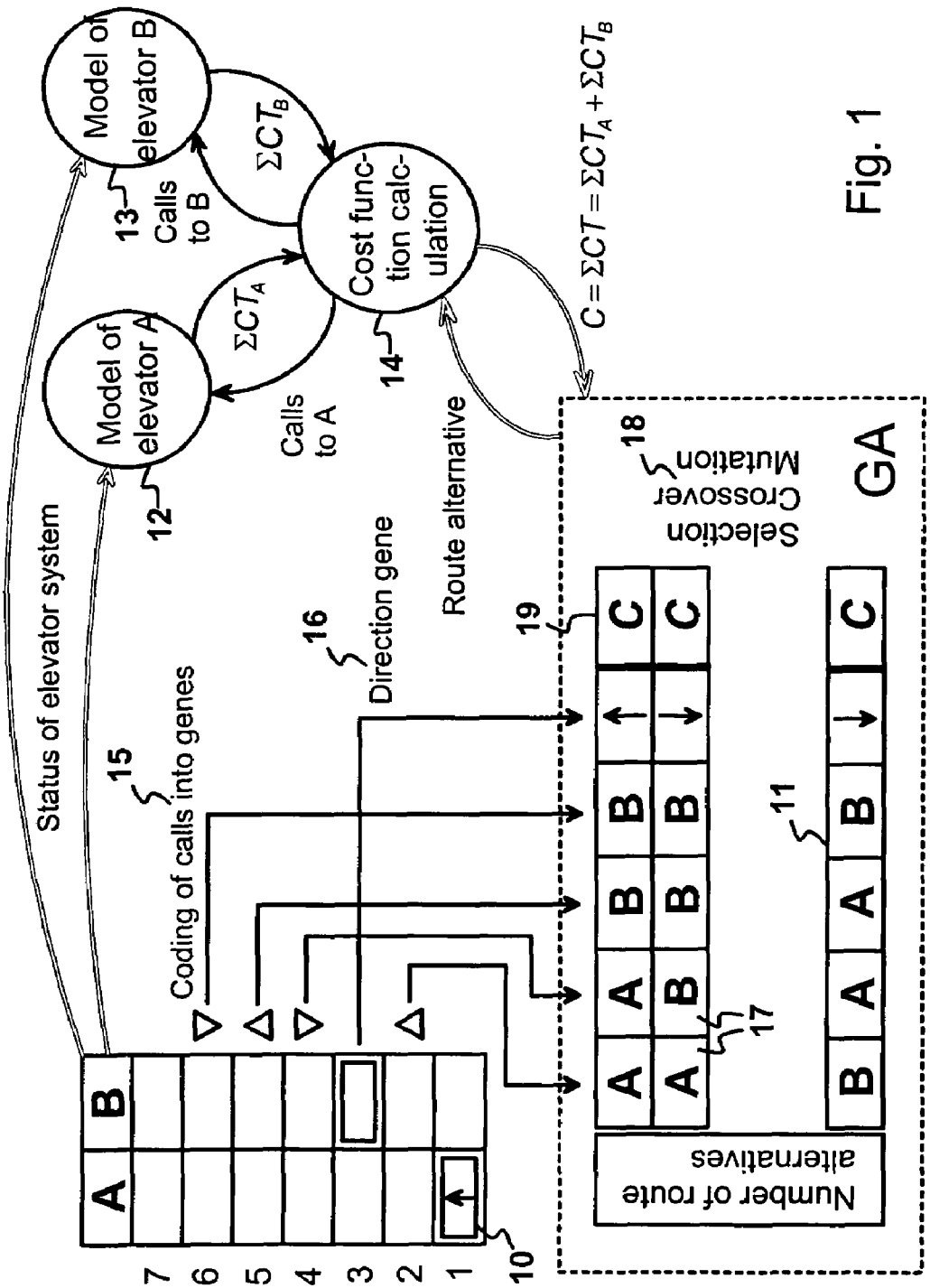

This application is a Continuation of copending PCT International Application No. PCT/FI2007/000038 filed on Feb. 16, 2007, which designated the United States, and on which priority is claimed under 35 U.S.C. § 120. This application also claims priority under 35 U.S.C. § 119(a) on Patent Application No(s). FI20060214 filed in Finland on Mar. 3, 2006. The entire contents of each of the above documents is hereby incorporated by reference.

FIELD OF THE INVENTION

The invention relates to the control of an elevator group. In particular the subject of the invention is a method and an appliance for controlling an elevator group by allocating landing calls taking into account especially the potential energy and the kinetic energy of the elevators. The term 'elevator' refers here to the sum of the moving masses moved in a single elevator shaft irrespective of whether one, two or more elevator cars are disposed in the elevator shaft. In a system of double-deck cars and multi-deck cars, the cars are fixed to each other one on top of the other such that the cars simultaneously serve floors that are one above the other.

BACKGROUND OF THE INVENTION

Among many other different tasks, one basic function of elevator group control is the allocation of landing calls. The objective of allocation is to give calls to be served by the elevator cars in such a way that a performance indicator describing the elevator system is as good as possible. Conventionally the most commonly used performance indicators relate to call times and passenger waiting times. Typically averages are calculated from these times and their distributions are established.

There are many types of allocation methods for landing calls and each elevator manufacturer has its own methods for implementing this task. One common feature of all these different methods, however, is that they include a set of parameters specific to each method, with which the operation of the method used is affected.

The targets for monitoring are typically landing calls, car calls, the loads of the elevators and the states of motion of the elevators. At peak hours the aim can be giving priority to minimizing the travel time of a user of the elevator. Another common target for optimization, which is especially in the interests of the owner of the building, is the energy consumption of the elevator system.

Numerous targets for optimization can be found such as the call time, the estimated waiting time of the passengers, run time and travel time, the number of stops, the car load, the number of simultaneous car calls and landing calls, etc. What must be decided is which of these targets should be given priority and how much priority in which traffic situations.

Energy consumption is an important minimization target because the non-renewable energy resources on the planet are limited and growing energy consumption causes many indirect impacts e.g. in the form of the greenhouse effect. The operating expenses and maintenance expenses of buildings, for their part, can be influenced by using an elevator system that is economical in terms of its energy consumption. According to a study conducted in Hong Kong (Yim, Leung: "Building Towards Sustainability in Public Housing", proceedings of the conference 'Building for the 21$^{st}$ century', London, 2001), of the energy consumption of the public spaces of one typical 40-storey residential building (i.e. excluding the personal electricity consumption used by the residents themselves) the elevator system consumes approx. 18 percent. Another study estimates that the elevator system uses between five and fifteen percent of the total energy consumption of a building. In order to reduce the energy consumption of one elevator, the transport capacity of the elevator, the motor, the ratios in the power input and generally the design of the mechanical parts of the system must be taken into account.

The international patent application WO 02/066356 presents a control method for an elevator system, in which the energy consumed by the elevator system is minimized such that the desired requirement of the service time of elevator passengers is fulfilled on average. In this method a target value is given for a certain service time of an elevator group and landing calls are allocated to different elevators such that over a longer time span the condition of the service time examined is fulfilled, but at the same time the energy consumption of the system is at its minimum. For example the call time from the giving of the call to the arrival of the elevator, the total travel time or the run time examining only the time spent in the elevator car can be used as a service time.

In one application according to patent application WO 02/066356 two magnitudes that are of different types and are non-commensurable are optimized, i.e. waiting time and energy consumption. For these magnitudes to be made commensurable and comparable with each other, the routes R of the elevators are selected such that the cost term $$C = W_T T_N(R) + W_E E_N(R) \qquad (1)$$

is minimized. $T_N(R)$ is the normalized sum of call times with route alternative R and likewise $E_N(R)$ is the normalized energy consumption caused by route alternative R. $W_T$ and $W_E$ are the weighting coefficients of the aforementioned cost terms such that $$0 \leq W_T \leq 1 \text{ and } W_E = 1 - W_T. \qquad (2)$$

Publication U.S. Pat. No. 6,857,506 describes another type of call allocation method for an elevator system. In the method an energy consumption file is formed, which describes the energy consumptions of each possible elevator trip between two floors. The elements of the energy consumption file thus have the departure floor, the arrival floor and the load of the car as variables. When the energy consumed for each trip between two floors is known, the routing of the elevator cars can be calculated for the calls that are active such that the total energy consumption of the system is minimized.

Publication FI 115130 also relates to the controlling of an elevator group. In this method it is also possible to set a desired target value for a certain service time, such as for the average waiting time of passengers. In this case the aim is to minimize energy consumption such that an available model of the elevator system is utilized in the optimization. By means of the model the desired service time can be forecast. The system also includes a PID regulator that utilizes the forecast service times and thus the cost function can be optimized more effectively. Numerous route alternatives according to smaller energy consumption are obtained from the optimizer, from which the solution according to the target value of the desired service time is selected.

A common denominator for the above-described prior-art solutions is that the routes of the elevator cars are defined so that the change in potential energy of the system caused by transferring the passengers in the height direction is minimized. Considered in this context the system includes all the mass points that move in the vertical direction, in other words the elevator car with counterweight and the passengers of the elevators.

One problem with prior art is that in the minimizations of energy consumption according to prior art only the masses to be moved in the system and the length of journeys, i.e. the height difference between the departure floor and the arrival floor, have been considered. When considering the optimization of energy consumption it is possible to perform it more precisely by including the energy term relating to the speeds of the elevators.

PURPOSE OF THE INVENTION

The purpose of the present invention is to disclose an allocation method for elevator cars, in which the energy consumed by the system is minimized taking into account both the potential energy and the kinetic energy prevailing in the elevator system.

SUMMARY OF THE INVENTION

The method according to the invention is characterized by what is disclosed in the characterization part of claim 1. The control system according to the invention is characterized by what is disclosed in the characterization part of claim 11. The computer program according to the invention is characterized by what is disclosed in the characterization part of claim 21. Other embodiments of the invention are characterized by what is disclosed in the other claims. Some inventive embodiments are also presented in the drawings in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. The features of the various embodiments can be applied within the scope of the basic inventive concept in conjunction with other embodiments.

The present invention discloses a method for controlling the elevators belonging to an elevator group based on the calls given, in which the elevator comprises one or more elevator cars disposed in the same elevator shaft and in the method a genetic algorithm is used. In a genetic algorithm at least one allocation option, i.e. chromosome, is formed in which the chromosome contains call data and elevator data for each active landing call or destination call, and this data, i.e. genes, together determine the elevator car that serves each landing call or destination call. Further, in the algorithm the value of the cost function for each chromosome is determined. After this at least one chromosome is formulated with respect to at least one gene. After this the value of the cost function for each formulated chromosome is determined. The formulation of chromosomes is repeated until the end criterion is fulfilled. Based on the values of the cost function the best chromosome is selected and the elevator cars are directed to the calls given according to the genes of the selected best chromosome. A characteristic of the present invention is that in the method information about the run type, i.e. the run type gene, in which the run type determines the speed profile, is linked to the chromosome in connection with each call data call and each elevator data, according to which the elevator that owns the elevator car travels between the departure floor and the call issuing floor defined by the call gene linked to the run type gene.

In one embodiment of the present invention by means of the speed profiles determined by the car loads and the run types of the elevators the kinetic energies of the elevators on each elevator trip are determined. The total energy consumed by the elevator system is selected as the cost function or part thereof such that the term applying to the kinetic energy of the elevators is included in the cost function. Finding the global minimum value of the total energy consumption of the elevator system is selected as the end criterion.

According to another embodiment of the present invention chromosomes are formulated as the next generation of the genetic algorithm by selection, by crossover and/or by mutation.

According to another embodiment of the present invention the end criterion is fulfilled when the pre-determined value of the cost function, the number of generations, the processing time of the algorithm or adequate homogeneity of the population is achieved. Homogeneity in this context means a situation in which when forming the successive generations of the genetic algorithm the same chromosomes are passed on from one generation to the next.

According to another embodiment of the present invention the cost function of the chromosome is defined such that it includes an energy consumption term and a service time term, weighting both with pre-set weighting coefficients. In addition, the models of the elevators and the current status of the elevator system can be used as an aid in the calculation of the cost function.

According to another embodiment of the present invention at least one of a set of terms, which includes the energy consumption of the elevator system, the waiting time of a passenger, the travel time of a passenger, and the run time of a passenger, is selected as the term of the cost function. Additionally the kinetic energy of the elevators, the potential energy stored in the elevators, the energy consumed by friction and other losses, as well as the energy regenerated to the power input system, are taken into account when calculating the energy consumption.

According to another embodiment of the present invention at least one restriction from a set of magnitudes is defined for the speed profile of each elevator run according to the run type, which magnitudes include the maximum speed, the maximum acceleration and the maximum jerk of the elevator, and in which jerk is defined as a change in acceleration per unit of time.

According to another embodiment of the present invention a direction gene for the chromosome is defined for each stationary elevator.

According to another embodiment of the present invention the run types are defined as "normal", "slightly decelerated", "clearly decelerated", "slightly accelerated" and "clearly accelerated". In this case the run types are defined by setting the maximum speeds used by the elevators such that the run type "normal" means the nominal travel speed of the elevator and with the other run types the travel speed of the elevator deviates from the nominal value in percentage terms by the amount of the pre-set value.

The inventive concept of the present invention in addition to the method also includes a similar control system for an elevator system, in which the aforementioned phases of the method are performed by a GA optimizer.

The inventive concept of the present invention further includes a computer program, which when run is defined to perform the different phases of the method described above.

As can be concluded from the foregoing, when calculating the optimal (i.e. that giving the smallest energy consumption) routing of the elevator cars, both the potential energy linked to the mass points of the system and the kinetic energy linked to the moving and rotating parts can be taken into account. In addition the losses caused by friction can still be examined. A substantial advantage of the present invention is thus the inclusion of kinetic energy in the optimization evaluation, whereas prior art techniques instead take only the potential energies and friction losses into account. When the run speed profile is included in the optimization, the GA optimizer can use more route alternatives in which the energy consumption remains low. Because the kinetic energy is dependent on the square of the speed, with a relatively small change of the car speed the kinetic energy prevailing in the system can be substantially influenced and thus via this the energy economy of the whole system. For example with a variation of ±20 percent in the top speed of the car a range of variation −36% . . . +44% in the kinetic energy of the car is obtained.

When genetic algorithms have in this case more route alternatives available, of which the alternative fulfilling the desired criterion is selected, it is obvious that optimization in the situation according to the invention functions on average better and in this case the elevator system consumes less energy compared to prior art techniques without however degrading the level of service offered to its users.

LIST OF FIGURES

Figure 2:
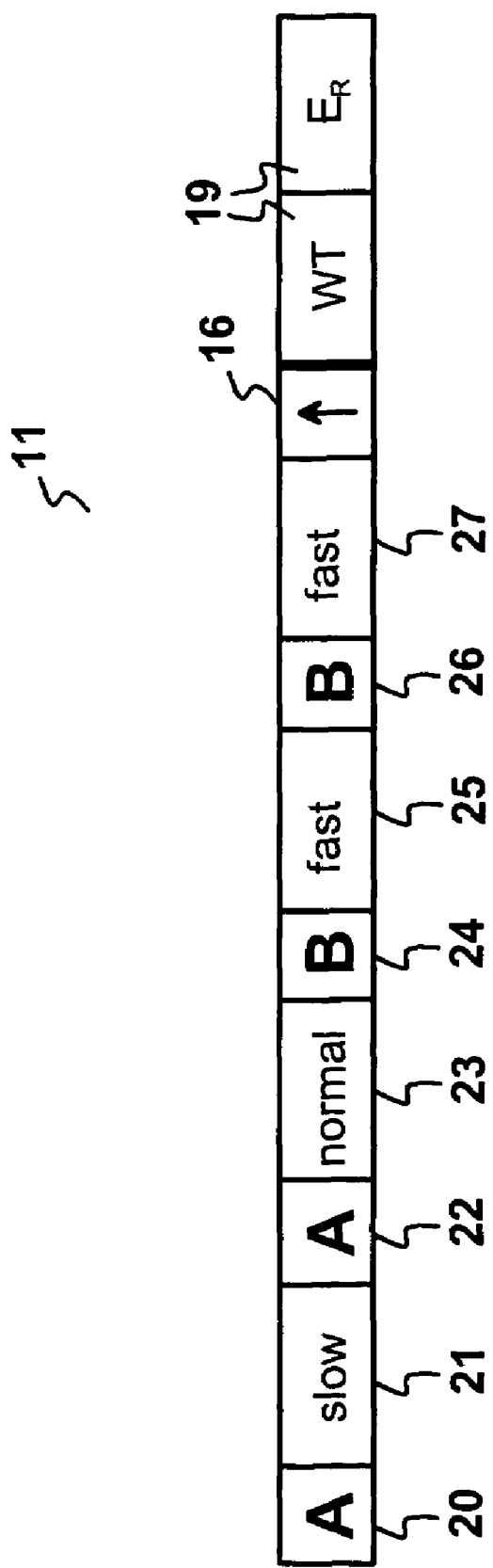

FIG. 1 presents a method of routing elevator cars according to the present invention, in which so-called genetic algorithms are utilized, and FIG. 2 presents the structure of a chromosome of a genetic algorithm according to the present invention.

DETAILED DESCRIPTION OF THE INVENTION

With regard to the characteristic attributes of the present invention reference is made to the claims.

The present invention discloses a method for allocating elevator cars based on the active calls, utilizing prior art genetic algorithms and a novel structure of chromosome according to the present invention. The basic concept of the present invention is to include in the examination the kinetic energy linked to the masses and to the speeds of the system in addition to the potential energy.

It can be considered that an individual elevator in use comprises three mass components, namely the empty elevator car, the counterweight of the elevator and the passengers inside the elevator car. If the passenger capacity of the elevator car is CC (in kilograms), then in this case the counterweight can be dimensioned so that:

$$m_{cw} = m_{car} + \frac{1}{2}CC \quad (3)$$

The mechanical energy consumed and that part returned to the use of the system in the run of the elevator from one floor to another, is determined via the potential energy, the kinetic energy and the energy losses, if the losses are caused by friction occurring in the system:

$$E_P = \left(m_p - \frac{1}{2}CC\right)\Delta h \cdot g \quad (4)$$

$$E_k = \frac{1}{2}m_s \hat{v}^2$$

$$E_F = F_\mu \Delta h$$

In equation (4) $\Delta h$ is the distance between the departure floors and the arrival floors, $m_p$ is the internal load of the car, $m_s$ is the effective inertial mass of all the masses moving linearly and rotationally and $\hat{v}$ is the largest speed attainable during the run. $F_\mu$ is the total effective frictional force exerted on all the moving parts and on the traction equipment of the car. Modern elevator machines are able to return the potential energy and the kinetic energy of the system back to the power source at some co-efficient of efficiency $\eta_R$, in which:

$$0 < \eta_R < 1 \quad (5)$$

In older machines the energy is directed to a load resistance, in which case the co-efficient of efficiency $\eta_R$ is zero.

The motion of the elevator car is controlled in the control system, which in modern elevators operates by means of a closed feedback loop. The purpose of this is to control the elevator car so that the motion of the elevator car is pleasantly even, in other words the car does not jerk i.e. in which case da/dt (the change in acceleration in a time unit) remains in practice at zero or very small. The energy needed on the elevator trip is taken from the power source and energy is consumed in electrical and mechanical losses. Energy is stored when the elevator car(s) move(s) in the form of kinetic energy of the elevator forming the combined kinetic energy of the elevator cars and the kinetic energy of other moving masses, such as the counterweight, contained in one elevator. The examinations of energy and speed can thus be extended to other solutions also, in which at least one elevator shaft of the building contains a double-deck or multi-deck elevator. When the car stops after an elevator trip and depending on the direction of movement of the car and on the car load, the potential energy that prevailed in the system at the beginning of the elevator trip changes and a part of the kinetic energy that prevailed during the trip returns to the system in the form of potential energy. One example that can be considered is an elevator car with full load moving upwards. In the deceleration phase of the car a part of the kinetic energy of the car is consumed in losses caused by friction and a part changes to potential energy and the remaining energy can be returned to the power source via the power transmission system. It is very difficult to deduce a general formula for the energy consumed during the elevator trip, because the control system and its feedback connection and also partly the power transmission system complicate the situation.

the following the relative difference of the weightings of the energy terms in an elevator system of practice is evaluated. A simplification is made in this point, according to which three different kinds of energy (kinetic energy, potential energy and losses) are assumed to be independent of each other. In this case each of these energy terms can be examined separately.

regards power input the flow of energy can be examined from the standpoint of potential energy as follows:

$$E_{PSP} = E_P \cdot \eta_M^{-1} | E_P \geq 0 \text{ and} \quad (6)$$

$$E_{PSP} = E_P \cdot \eta_R | E_P < 0,$$

in which $\eta_M$ is the coefficient of efficiency of the power transmission equipment during the run and $\eta_R$ is the coefficient of efficiency of regeneration of energy (energy returned to the use of the power source).

Correspondingly the net kinetic energy is the difference of the input energy required for the top speed of the car and the regenerated energy:

$$E_{PSK} = E_K \eta_M^{-1} - E_K \eta_R = E_K (\eta_M^{-1} - \eta_R) \quad (7)$$

The losses caused by friction are obtained from:

$$E_{PSF}=E_F\eta_M^{-1} \tag{8}$$

From the standpoint of the allocation of landing calls and from the standpoint of the routing of the elevator cars the most interesting energy forms prevailing in the elevator system are potential energy and kinetic energy. By defining different route alternatives for the elevator cars the directions of movement and the car loads can be changed. At the same time the magnitudes of the energies changing from one form to another change depending on the routing. The control system of the elevators is able to influence the parameters relating to the run, of which the most essential are the speed, acceleration and so-called jerk (previously defined as the change in acceleration in a unit of time) of the elevator car. Since the speed of motion of the car can be influenced with the control and thus also the maximum speed (e.g. by regulating the period of time the force is exerted on the car), the kinetic energy described by the equation (7) is in this way also directly affected.

Let us examine in the following by way of an example the order of magnitude of the range of variation of kinetic and potential energy, when the subject of the examination is an empty elevator car and an elevator car with maximum load (full of people). If it is assumed that the mass of the empty elevator car with respect to its maximum load (maximum number of passengers) CC is:

$$m_{car}=2.5 \cdot CC, \tag{9}$$

then according to equation (3) the following is obtained for the mass of the counterweight:

$$m_{cw}=3 \cdot CC \tag{10}$$

When it is assumed that the combined mass of the other moving mass points (such as the trailing cable) is:

$$m_r=0.5 \cdot CC, \tag{11}$$

then the total mass to be moved that we obtain is:

$$m_S=m_P+6 \cdot CC \tag{12}$$

If additionally it is assumed that the control system is able to change the top speed of the elevator car by ±20 percent of its nominal value, the range of variation of the kinetic energy between the situations according to a full and an empty elevator car can be calculated using the aforementioned equations:

$$\Delta E_{PK} \approx 6CC\hat{v}^2 \cdot (\eta_M^{-1}-\eta_R)/2 \tag{13}$$

In a corresponding manner an estimate for the magnitude of the range of variation of the potential energy is obtained:

$$\Delta E_{PP} \approx CC\Delta hg \cdot (\eta_M^{-1}+\eta_R)/2 \tag{14}$$

From equations (13) and (14) the relationship of the ranges of variation can be calculated:

$$\frac{\Delta E_{PP}}{\Delta E_{PK}} \approx \frac{\Delta hg}{6\hat{v}^2} \tag{15}$$

It must be noted that the control system does not need to support regeneration if it is desired to optimize energy consumption just by examining the potential energy. In a non-regenerative system the opportunity for reducing energy consumption is halved compared to a regenerative system, and the range of variation of the potential energy of a non-regenerating system is thus in the above example:

$$\Delta E_{PP} \approx CC\Delta hg \cdot (\eta_M^{-1}+\eta_R)/4 \tag{16}$$

One prior-art method of allocating elevators based on the calls is to use genetic algorithms (GA) especially in large elevator systems. Genetic algorithms are described in e.g. patent publication FI 112856. The operating principle of genetic algorithms is also illustrated in the example of FIG. 1, which is described in the following.

Genetic algorithms do not absolutely guarantee finding the most optimal routing, but the results obtained in practical applications are fairly close to it. In genetic algorithms the travel routes of the elevators 10 of the system can be coded 15 to different chromosomes 11, in which the position of one gene 17 defines an active call and the value of the gene 17 the elevator (elevator A or B) allocated to the call. In the example of FIG. 1 there are four active calls; given on floors two, four, five and six. A special direction gene can also be defined for a stationary elevator (e.g. on floor three), the value of which can be "upwards" or "downwards" 16 describing the starting direction of the elevator in question. The system starts moving e.g. from a randomly selected route alternative, to which different genetic procedures such as crossover, mutation and selection 18 are applied. Crossover means randomly integrating two route alternatives into one new route alternative. In mutation the values of the genes of the chromosome are randomly changed. A set of new chromosomes are formed a generation at a time by means of these genetic procedures 18 and at the same time the viability of the chromosomes obtained is examined for the purposes of further processing. Viability can mean for instance undercutting the value of a certain waiting time or undercutting a desired energy consumption value. In the viability definition the models 12, 13 applying to elevators can be used to good advantage. In the example of FIG. 1 viability is measured by calculating the values for the so-called cost function 14. In this example the function to be calculated is the sum C of the call times. Each route alternative 11 is directed to the calculation of the cost function 14, and the value C of the cist function obtained as a result is coded also as a cost gene 19 in the chromosome. The chromosome results given by the algorithm at some time converge, in other words e.g. the chromosomes that give the smallest C are at the end selected for further processing. Finally, from the last set of chromosomes for processing, the best or most suitable in terms of its viability are selected. The routing of the elevators is controlled according to the genes of the chromosome selected and the passengers are thus allocated to the elevators. The genetic algorithm operates on this principle continuously, because when a new active call becomes known to the elevator system, the chromosome 11 must be defined again and the aforementioned operations 18 must be applied to the new chromosome 11.

The present invention utilizes genetic algorithms, but a new concept about the use of run types is attached to the foregoing method. This means that e.g. a number of different speed classes can be defined for the elevators, at which the elevators move. As one preferred embodiment, three different classes can be defined: "fast", "normal" or "slow". As another preferred embodiment five different speed classes can be defined: "very slow", "rather slow", "normal", "rather fast" and "very fast". The speed classes are defined such that at the standard speed of the elevator a run speed is set for the part of the elevator trip to be traveled, in other words the maximum travel speed of the elevator is restricted to this set value for speed for the whole elevator trip. The classes can be defined to deviate from their nominal values (from the normal) e.g. by ±10 percent or by ±20 percent. In addition, acceleration (a) and the jerks of the elevator car describing a change of the acceleration in a time unit (jerk=Δa/Δt) can be included in the examination, and the same types of classes can be defined also for these magnitudes that relate both to kinetic energy and to passenger comfort. Thus in the profile of the classes e.g. the top speed of the elevator car, the maximum acceleration as well as the maximum permitted jerk can be defined, or on the other hand only one or two of the aforementioned magnitudes can be included in the profile.

It is characteristic of the present invention that a new type of extra gene is formed in the chromosome 11 of the GA system according to FIG. 1 in connection with each landing call. This kind of chromosome is described by way of an example in FIG. 2. The new type of gene is called in this context the run speed gene or the run type gene of the elevator. In the example of FIG. 2 there are three different alternatives for the run speed of the car; normal run speed, decelerated run speed and accelerated run speed. The operator of the elevator system can set these speeds in the control system. The slow and fast run modes can be e.g. in the aforementioned manner under or over the nominal run speed by the amount of the desired percentage.

The top chromosome 11 has been picked for FIG. 2 from the set of chromosomes according to FIG. 1. Four active calls can be seen in chromosome 11, for which elevator A 20 has been allocated to the up call given on floor two, also elevator A 22 to the down call given on floor four, elevator B 24 to the up call on floor five and also elevator B 26 to the down call given on floor 6. In addition in the manner of FIG. 1 chromosome 11 contains a direction gene 16 concerning the stationary elevator on floor three. In the case of FIG. 2 the cost gene 19 contains two parts, the waiting time WT of the passengers and the energy consumption $E_R$ of the route. The cost gene does not however restrict only these magnitudes, but instead the term of the calculated cost function can be some other magnitude to be optimized. The different magnitudes can also be weighted in the cost function with the desired weighting coefficients.

Thus it is characteristic of the present invention that a run type gene, which determines how to drive to a floor according to each landing call, is connected to each call gene 20, 22, 24, 26. The classes of the top speeds of these trips between floors can be seen in connection with each call gene. In the following it is assumed that a chromosome exactly according to FIG. 2 is selected for use by the control of the elevator system as the final result given by the genetic algorithm for an optimized route alternative. For example the elevator A drives the first call 20 at slow maximum speed (according to run type gene 21), which ensures even and jerk-free travel for the car. When the elevator has collected the landing call 20 of floor two, the elevator A continues towards floor four to collect call 22. For this second run between floors the elevator takes its nominal value for its top speed, because the run type gene 23 gives "normal" for the run speed. In a corresponding manner the elevator B leaves floor three at a high top speed after this towards floor five (run type gene 25 "fast"). After this the elevator B travels between floors five and six at a fast top speed, as expressed by the fourth gene pair 26, 27 of the chromosome.

Through the run type classes, the speed profile of the elevator and thus also of each elevator car is obtained for the use by the genetic algorithm. Thus more alternatives for allocating cars to each active call are obtained. Since the top speed for different floor-to-floor heights can vary, not only does the travel time used by different route alternatives vary, but also the magnitude of the kinetic energy stored in the elevator on the route. According to what is described above the forms of energy convert between the energy given by the power source, kinetic energy and potential energy, and some of the energy is consumed in losses and some is returned to the use of the system. In this case logically thinking it must be assumed that e.g. in a route alternative giving minimum energy consumption the maximum speeds used by the elevator cars do not remain constant when comparing elevator trips between two floors with each other. There are thus clearly more alternatives available to the genetic algorithm, from which to select e.g. exactly the route that gives minimum energy consumption. For example during the time of exit traffic; when passengers are trying to descend from floors to the exit floor on the street level, it is more advantageous from the standpoint of energy to gather as many passengers as possible into the elevator cars. By means of the speed classes filling of the cars can be improved when empty elevators are sent more slowly than normal from the exit floor back to the floors to collect people leaving the building. In this case the arrival of the elevator lasts longer and more passengers than on average are waiting for the elevator. As a consequence of this the cars are filled faster already in the upper part of the building, which promotes regeneration of the potential energy linked to the passengers. This being the case, since there are more alternatives, it can be assumed that the extension according to the present invention gives better optimized routings irrespective of whether it is the time or the energy used that is linked to the optimization target.

Although the aforementioned examples address only the allocation of landing calls, the invention is not limited to this conventional call system. The present invention can apply also to a so-called destination floor call system, in which the user gives his/her destination floor call already in the lobby of the departure floor. A destination floor call system can also be called a destination call system. When using this kind of system there is no longer any need to give a separate call in the elevator car. The elevator cars are allocated in this case to each passenger and not separately to each up-call or down-call as in a conventional system.

The basic idea of the invention is further applicable to double-deck and multi-deck elevator systems. In these elevator systems two or more elevator cars are respectively situated one on top of the other in the same elevator shaft such that the elevator cars disposed in one shaft together form a moveable fixed unit i.e. an elevator. The distance between two elevator cars is dimensioned in this case to be the same as the distance between two floors. In the allocation method the chromosome includes each elevator car separately as well as if necessary a direction gene for the specific elevator. When each chromosome, i.e. routing alternative, is evaluated in the optimizer, in the model of the elevator system the "detached" elevator cars in the chromosome are first attached to those elevators to which they belong. After this the cost function is calculated from the route indicated by the chromosome using this elevator situated in one elevator shaft with all its cars and hoisting machines. The costs can be the same magnitudes as those mentioned above, in other words e.g. the call time, the waiting time or the change in the potential energy or in the kinetic energy of the elevator (i.e. the whole hoisting machine, not just one car). Finally the allocation method indicates for each call given the most suitable elevator car out of all the elevator cars.

The invention is not limited solely to the embodiments described above, but instead many variations are possible within the scope of the inventive concept defined by the claims below.

The invention claimed is:

1. Method for controlling the elevators belonging to an elevator group based on the calls given, in which the elevator comprises one or more elevator cars disposed in the same elevator shaft, and in which method a genetic algorithm is used, according to which algorithm:

at least one allocation option i.e. chromosome is formed, which chromosome contains call data and elevator data for each active landing call or destination, which data i.e. genes together determine the elevator car serving the landing call or destination call;

for each chromosome a value of the cost function is determined;

at least one chromosome with respect to at least one gene is formed;

for each chromosome formed a value of the cost function is determined;

the forming of chromosomes is repeated, until the exit criterion is fulfilled;

on the basis of the values of the cost function the best chromosome is selected; and the elevator cars are directed to the given calls according to the selected best genes of the chromosome, wherein the method further comprises the phase:

information about the run type i.e. the run type gene is linked to the chromosome in connection with each call data and each elevator data, in which run type gene the run type determines the speed profile, according to which the elevator that owns the elevator car travels between the departure floor and the call issuing floor defined by the call gene linked to the run type gene.

2. Method according to claim 1, wherein the method further comprises the phases:

the kinetic energies of the elevators on each elevator trip are determined by means of the speed profiles determined by the car loads and the run types of the elevators;

the total energy consumed by the elevator system is selected as the cost function or part thereof such that the cost function includes a term applying to the kinetic energy of the elevators; and finding the minimum value of the global total energy consumption of the elevator system is selected as the exit criterion.

3. Method according to claim 1, wherein the method further comprises the phase: chromosomes are formulated as the next generation of the genetic algorithm by selection, by crossover and/or by mutation.

4. Method according to claim 1, wherein the exit criterion is fulfilled when the pre-determined value of the cost function, the number of generations, the processing time of the algorithm or adequate homogeneity of the population is achieved.

5. Method according to claim 1, wherein the method further comprises the phase:

the cost function of the chromosome is defined such that it includes an energy consumption term and a service time term, weighting both with pre-set weighting coefficients; and models of the elevators and the current status of the elevator system are used as an aid in the calculation of the cost function.

6. Method according to claim 1, wherein the method further comprises the phases:

at least one term from a set, which includes the energy consumption of the elevator system, the waiting time of a passenger, the travel time of a passenger and the run time of a passenger, is selected as a term of the cost function; and when calculating the energy consumption, the kinetic energy of the elevators, the potential energy stored in the elevators, the energy consumed in friction and/or other losses, as well as the energy regenerated to the power transmission system are taken into account.

7. Method according to claim 1, wherein the method further comprises the phase:

at least one restriction from a set of magnitudes is defined for the speed profile of the elevator run according to each run type, which includes the maximum speed of the elevator, the maximum acceleration and the maximum jerk, and in which jerk is defined as a change of acceleration per unit of time.

8. Method according to claim 1, wherein the method further comprises the phase:

a direction gene for the chromosome is defined for each stationary elevator.

9. Method according to claim 1, wherein the method further comprises the phase:

"normal", "slightly decelerated", "clearly decelerated", "slightly accelerated" and "clearly accelerated" are defined as run types.

10. Method according to claim 9, wherein the method further comprises the phase:

run types are defined by defining the maximum speeds used by the elevators such that with the run type "normal" the nominal travel speed of the elevator is used and with the other run types the travel speed of the elevator deviates from the nominal value in percentage terms by the amount of the pre-set value.

11. Control system of an elevator group for controlling the elevators belonging to an elevator group based on the calls given, in which an elevator comprises one or more elevator cars in the same elevator shaft, and which control system comprises a GA optimizer, utilizing a genetic algorithm, in which the GA optimizer is arranged:

to form at least one allocation option i.e. chromosome, which chromosome includes call data and elevator data for each active landing call or destination call, which data i.e. genes together determine the elevator car serving each landing call or destination call;

to determine for each chromosome the value of the cost function;

to formulate at least one chromosome with respect to at least one gene;

to determine for each formulated chromosome the value of the cost function;

to repeat the formulation of chromosomes until the exit criterion is fulfilled;

to select the best chromosome based on the values of the cost function; and to direct the elevator cars to the given calls according to the genes of the selected best chromosome, wherein the GA optimizer is further arranged:

to link information about the run type, i.e. the run type gene, in which the run type determines the speed profile, to the chromosome in connection with each call data call and each elevator data, according to which the elevator that owns the elevator car travels between the departure floor and the call issuing floor defined by the call gene, linked to the run type gene.

12. Control system according to claim 11, wherein the GA optimizer is further arranged:

to determine the kinetic energies of the elevators on each elevator trip by means of the speed profiles determined by the car loads and the run types of the elevators;

to select as the cost function or part thereof the total energy consumed by the elevator system such that the cost function includes a term applying to the kinetic energy of the elevators; and to select the finding of the global minimum value of the total energy consumption of the elevator system as an exit criterion.

13. Control system according to claim 11, wherein the GA optimizer is further arranged:
to formulate chromosomes as the next generation of the genetic algorithm by selection, by crossover and/or by mutation.

14. Control system according to claim 11, wherein in the GA optimizer the end criterion is fulfilled when the pre-determined value of the cost function, the number of generations, the processing time of the algorithm or adequate homogeneity of the population is achieved.

15. Control system according to claim 11, wherein the GA optimizer is further arranged:
to define the cost function of the chromosome such that it includes an energy consumption term and a service time term, weighting both with pre-set weighting coefficients; and
to use models of the elevators and the current status of the elevator system as an aid in the calculation of the cost function.

16. Control system according to claim 11, wherein the GA optimizer is further arranged:
to select at least one term from a set, which includes the energy consumption of the elevator system, the waiting time of a passenger, the travel time of a passenger and the run time of a passenger, as a term of the cost function; and
to take into account when calculating the energy consumption, the kinetic energy of the elevators, the potential energy stored in the elevators, the energy consumed in friction and/or other losses, as well as the energy regenerated to the power transmission system.

17. Control system according to claim 11, wherein the GA optimizer is further arranged:
to define at least one restriction from a set of magnitudes for the speed profile of the elevator run according to each run type, which includes the maximum speed of the elevator, the maximum acceleration and the maximum jerk, and in which jerk is defined as a change of acceleration per unit of time.

18. Control system according to claim 11, wherein the GA optimizer is further arranged:
to define a direction gene for the chromosome for each stationary elevator.

19. Control system according to claim 11, wherein the GA optimizer is further arranged:
to define the run types as "normal", "slightly decelerated", "clearly decelerated", "slightly accelerated" and "clearly accelerated".

20. Control system according to claim 19, wherein the GA optimizer is further arranged:
to define the run types by defining the maximum speeds used by the elevators such that with the run type "normal" the nominal travel speed of the elevator is used and with the other run types the travel speed of the elevator deviates from the nominal value in percentage terms by the amount of the pre-set value.

21. Computer program for controlling the elevators belonging to an elevator group based on the calls given, in which the elevator comprises one or more elevator cars disposed in the same elevator shaft, and which utilizes a genetic algorithm, and in which the computer program comprises a program code, which when running on a data processing appliance is arranged to perform the following phases of the algorithm:

at least one allocation option i.e. chromosome is formed, which chromosome contains data and elevator data for each active landing call or destination call, which data i.e. genes together determine the elevator car serving the landing call or destination call;
for each chromosome a value of the cost function is determined;
at least one chromosome with respect to at least one gene is formed;
for each chromosome formed a value of the cost function is determined;
the forming of chromosomes is repeated, until the exit criterion is fulfilled;
on the basis of the values of the cost function the best chromosome is selected; and
the elevator cars are directed to the given calls according to the selected best genes of the chromosome,
wherein the program code when running on a data processing appliance is further arranged to perform the phase:
information about the run type i.e. the run type gene is linked to the chromosome in connection with each call data and each elevator data, in which run type gene the run type determines the speed profile, according to which the elevator that owns the elevator car travels between the departure floor and the call issuing floor defined by the call gene linked to the run type gene.

22. Computer program according to claim 21, wherein the program code when running on a data processing appliance is further arranged to perform the phases:
the kinetic energies of the elevators on each elevator trip are determined by means of the speed profiles determined by the car loads and the run types of the maximum travel speeds of the elevators;
the total energy consumed by the elevator system is selected as the cost function or part thereof such that the cost function includes a term applying to the kinetic energy of the elevators; and
finding the minimum value of the global total energy consumption of the elevator system is selected as the exit criterion.

23. Computer program according to claim 21, wherein the program code when running on a data processing appliance is further arranged to perform the phase:
chromosomes are formulated as the next generation of the genetic algorithm by selection, by crossover and/or by mutation.

24. Computer program according to claim 21, wherein the exit criterion is fulfilled when the pre-determined value of the cost function, the number of generations, the processing time of the algorithm or adequate homogeneity of the population is achieved.

25. Computer program according to claim 21, wherein the program code when running on a data processing appliance is further arranged to perform the phases:
the cost function of the chromosome is defined such that it includes an energy consumption term and a service time term, weighting both with pre-set weighting coefficients; and
models of the elevators and the current status of the elevator system are used as an aid in the calculation of the cost function.

26. Computer program according to claim 21, wherein the program code when running on a data processing appliance is further arranged to perform the phases:
at least one term from a set, which includes the energy consumption of the elevator system, the waiting time of a passenger, the travel time of a passenger and the run time of a passenger, is selected as a term of the cost function; and the kinetic energy of the elevators, the potential energy stored in the elevators, the energy consumed by friction and/or other losses, as well as the energy regenerated to the power input system, are taken into account when calculating the energy consumption.

27. Computer program according to claim 21, wherein the program code when running on a data processing appliance is further arranged to perform the phase:

at least one restriction from a set of magnitudes is defined for the speed profile of the elevator run according to each run type, which includes the maximum speed of the elevator, the maximum acceleration and the maximum jerk, and in which jerk is defined as a change of acceleration per unit of time.

28. Computer program according to claim 21, wherein the program code when running on a data processing appliance is further arranged to perform the phase:

a direction gene for the chromosome is defined for each stationary elevator.

29. Computer program according to claim 21, wherein the program code when running on a data processing appliance is further arranged to perform the phase:

"normal", "slightly decelerated", "clearly decelerated", "slightly accelerated" and "clearly accelerated" are defined as run types.

30. Computer program according to claim 29, wherein the program code when running on a data processing appliance is further arranged to perform the phase:

run types are defined by defining the maximum speeds used by the elevators such that with the run type "normal" the nominal travel speed of the elevator is used and with the other run types the travel speed of the elevator deviates from the nominal value in percentage terms by the amount of the pre-set value.

31. Computer program according to claim 21, wherein the computer program is stored on a data processing appliance on a readable medium.

* * * * *